United States Patent
Alazraki

(10) Patent No.: US 9,315,276 B2
(45) Date of Patent: Apr. 19, 2016

(54) OUTER FUEL TANK ACCESS COVER, WING AND AIRCRAFT DESCRIPTION

(71) Applicant: AIRBUS OPERATIONS S.L., Getafe, Madrid (ES)

(72) Inventor: Marcos Alazraki, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 281 days.

(21) Appl. No.: 13/828,499

(22) Filed: Mar. 14, 2013

(65) Prior Publication Data

US 2013/0306796 A1 Nov. 21, 2013

(30) Foreign Application Priority Data

May 16, 2012 (EP) .................................. 12382180

(51) Int. Cl.
- B64D 37/32 (2006.01)
- B64C 1/14 (2006.01)
- B64C 3/34 (2006.01)
- B64D 37/00 (2006.01)

(52) U.S. Cl.
CPC . B64D 37/32 (2013.01); B64C 1/14 (2013.01); B64C 1/1446 (2013.01); B64C 3/34 (2013.01); B64D 37/005 (2013.01); Y02T 50/44 (2013.01)

(58) Field of Classification Search
USPC ........... 49/141, 463, 465; 220/203.08, 203.09
See application file for complete search history.

(56) References Cited

U.S. PATENT DOCUMENTS

| | | | | |
|---|---|---|---|---|
| 2,597,682 A * | 5/1952 | Snow | ............................ | 220/327 |
| 4,291,816 A * | 9/1981 | Lamoureux | .................... | 220/243 |
| 4,530,443 A * | 7/1985 | Gorges | ........................... | 220/327 |
| 7,556,220 B2 * | 7/2009 | Schulz | ........................ | 244/129.4 |
| 8,443,575 B1 * | 5/2013 | Tanner et al. | ................. | 52/784.1 |
| 8,662,451 B2 * | 3/2014 | Delgado Jareno et al. | | 244/129.4 |
| 2008/0295905 A1 * | 12/2008 | Sandiford et al. | ............ | 137/587 |
| 2009/0294591 A1 * | 12/2009 | Ramirez Blanco et al. | .......................... | 244/129.4 |
| 2013/0205667 A1 * | 8/2013 | Pontes et al. | ....................... | 49/70 |
| 2013/0338973 A1 * | 12/2013 | Blanco Pacios et al. | ........... | 703/1 |
| 2014/0223829 A1 * | 8/2014 | Korenaga et al. | ............. | 49/483.1 |
| 2014/0239122 A1 * | 8/2014 | Hottin et al. | ............... | 244/135 R |

FOREIGN PATENT DOCUMENTS

| | | |
|---|---|---|
| DE | 40 20 842 | 1/1992 |
| EP | 0 170 300 | 2/1986 |
| EP | 2 441 678 | 4/2012 |
| GB | 2 335 172 | 9/1999 |

* cited by examiner

*Primary Examiner* — Tien Dinh
*Assistant Examiner* — Michael A Fabula
(74) *Attorney, Agent, or Firm* — Jenkins, Wilson, Taylor & Hunt, P.A.

(57) ABSTRACT

An outer fuel access tank cover (FTAC) of an aircraft, a wing including such outer FTAC of an aircraft, and an aircraft are disclosed. The outer FTAC of an aircraft is related to designing auxiliary pieces in the wing of aircrafts to control the risk of gases from an explosion occurred in the FTAC entering the fuel tank.

13 Claims, 5 Drawing Sheets

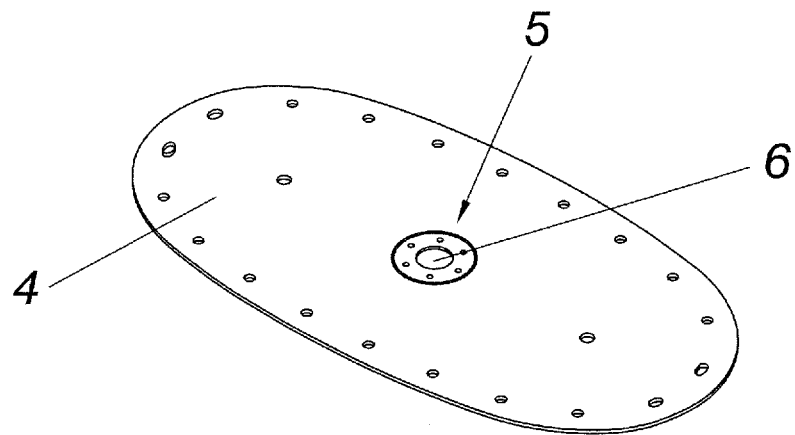
FIG. 2
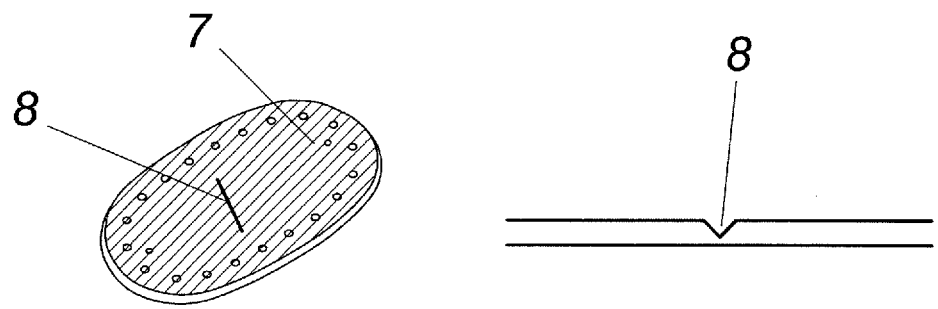
FIG. 3A
FIG. 3B
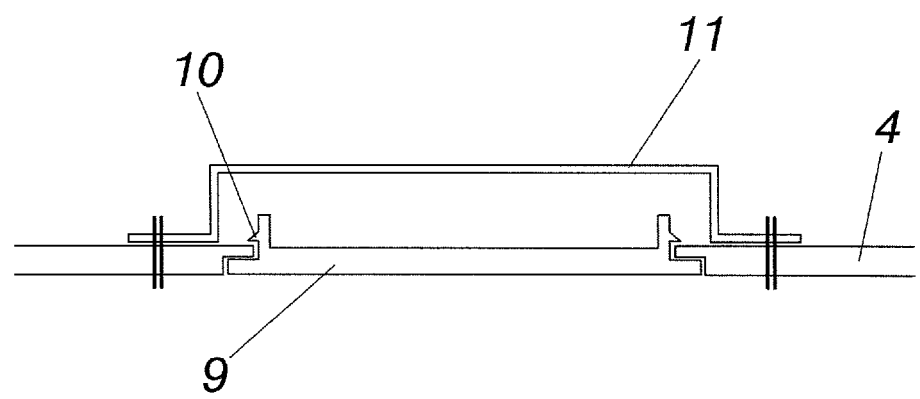
FIG. 4

OUTER FUEL TANK ACCESS COVER, WING AND AIRCRAFT DESCRIPTION

CROSS-REFERENCE TO RELATED APPLICATION

This application claims the benefit of the filing date of European Application Serial No. EP12382180.3 filed May 16, 2012 the disclosure of which is hereby incorporated herein by reference.

TECHNICAL FIELD

The present invention describes an outer fuel access tank cover (FTAC) of an aircraft, a wing comprising such outer FTAC of an aircraft and an aircraft. The invention belongs to the field of "designing auxiliary pieces in the wing of aircrafts to control the risk of gases from an explosion occurring in the FTAC entering the fuel tank".

BACKGROUND

Manholes in aircrafts provide access to the fuel tank. Manholes comprise an inner fuel tank access cover (inner FTAC), an outer FTAC and a void area between the two covers. Fuel Tank Access Covers (FTACs) are mechanically fastened and clamped against the aircraft wing skin to provide fuel tank access sealing. FTAC are designed to meet a wide array of requirements, some of them are: no fuel leaks, fire resistance, resistance to a tire impact, resistance to impacts resulting from an UERF (Uncontained Engine Rotor Failure), EMH/lightning strike, seal friction, and wing bending. Despite the "no fuel leaks" requirement, in the worst case scenario from an operational and certification standpoint, it is not uncommon that seals may leak if the FTAC is installed incorrectly. Therefore, it is impossible to guarantee 100% that small amounts of fuel will never under any circumstance be present in the void zone between covers. This may also happen when FTAC are dismantled on ground and fuel drips and saturates the area until the FTAC is reinstalled. If a lighting strike or an electric static discharge occurs, an explosion can take place inside the void area of the FTAC. The current design approach to address this is to contain the explosion of the fuel/air mixture within the void zone between the inner and outer FTAC. The problem with this approach is that the FTACs require a structure with high stiffness to prevent it from being deformed after an explosion in the void area. Said deformation of the inner FTAC or the outer FTAC or both would compromise the seal integrity between the inner FTAC and the lower wing skin. In essence, currently pressure vessels are created with no relief valves.

The mentioned prior art approach is seen in the patent U.S. Pat. No. 4,291,816 wherein a fluid tight closure for an aperture, adapted to form a fuel tank access door for an aircraft, and providing fail-safe features and resistance to lightning strikes is described.

SUMMARY

A solution for the stated problems is achieved by an outer FTAC according to claim 1. The particular embodiments of the invention are defined in the dependent claims.

The present invention approaches the technical problem described by providing a path of less resistance for the expansion of explosion gases through an outer fuel tank access cover (outer FTAC) of an aircraft adapted for being used to cover the outer opening of a void area of a manhole for accessing the interior of a wing of an aircraft wherein the interior of the wing comprises a fuel tank characterized in that the outer FTAC comprises an explosion gases relief means adapted for allowing the explosion gases to escape from the void area to the atmosphere.

The invention lets the gases escape from the void area through an exit door or fusible feature which eliminates the need to contain the explosion. In case of an explosion in the void area of the manhole the invention avoids the explosion from entering into contact with the fuel tank. As an advantage, the stiffness of the FTACs' structure is reduced. By reducing the stiffness requirement, a lighter structure is used yielding weight saving opportunities.

A second aspect of the invention presents a wing of an aircraft comprising at least one fuel tank access comprising an outer FTAC according to the first aspect of the invention.

A last aspect of the invention presents an aircraft comprising a wing according to the second aspect of the invention.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 2 This figure represents a view of a rupture disk.

FIG. 3A Represents a view of an embodiment of a frangible line.

FIG. 3B A zoomed view of the frangible line is represented.

FIG. 4 This figure represents a sectional view of a pop-off door.

DETAILED DESCRIPTION

Once the object of the invention has been outlined, specific non-limitative embodiments are described hereinafter.

Figure 1:
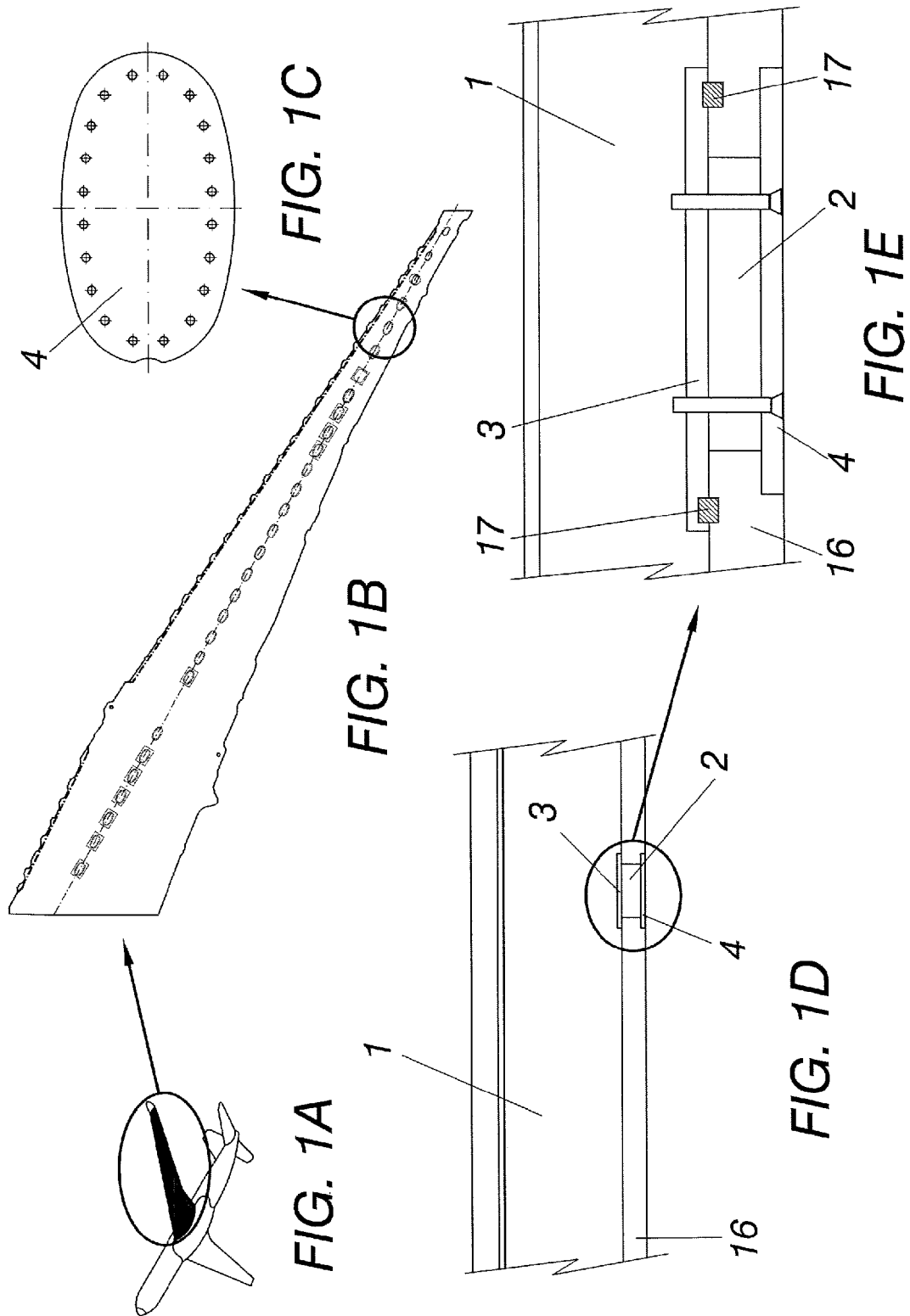
FIG. 1A This figure represents an embodiment of an aircraft wherein the left wing is shown in black.
FIG. 1B This figure shows the locations of the wing of the aircraft shown in FIG. 1A where the FTACs are located.
FIG. 1C In this figure an embodiment of an outer FTAC is represented.
FIG. 1D In this figure a sectional view of the inner area of the wing wherein the fuel tank is located is represented. Besides, the relative position of the FTACs to the fuel tank is shown. The different embodiments of the invention are located on the outer FTAC.
FIG. 1E In this figure a zoomed view of FIG. 1D is represented where the wing skin (16) is shown to be in contact with the void area (2) and the inner FTAC (3) is shown to be sealed to the wing skin (16) with fuel seals (17).

All the embodiments of the invention are located in the outer FTAC (4). An embodiment of an aircraft is represented in FIG. 1A and its left wing is shown in FIG. 1B where the locations where the FTACs (FIG. 1C) are located are shown. In FIG. 1D a sectional view of the inner area of the wing wherein the fuel tank (1) is located is represented. Besides, in FIGS. 1D and 1E the relative position of the FTACs to the fuel tank (1) is shown. The inner FTAC (3) is in the fuel tank (1) and it is sealed with fuel seals (17) to the lower wing skin (16). The outer FTAC (4) is fixed to the lower wing skin (16) by means of a plurality of mounting holes peripherally distributed. The fixing means, in an embodiment of the invention, are bolts. The different embodiments of the invention are located in the outer FTAC (4).

In a first embodiment of the invention the outer FTAC (4) comprises relief means which is a disk (5) which is ruptured once a predetermined level of pressure is reached. In FIG. 2 the disk (5) is a rupture disk. The rupture disk (5) is designed to provide a replaceable leak-tight seal within a vessel until the internal pressure rises to a predetermined level. The rupture disk (5) in the embodiment shown in FIG. 2 is riveted to the outer FTAC (4). In an embodiment it comprises a circular region (6) wherein the thickness is smaller the rest of the disk (5). The thickness of the centre (6) of the rupture disk (5) is such that it is the point with the highest stress when the rupture disk (5) is pressurized. This high stress point ruptures beyond a predetermined pressure. In the case of rupture, only the rupture disk (5) has to be replaced when it is damaged and the rest of the outer FTAC (4) remains undamaged.

In one embodiment the disk (5) is manufactured using a high strain material, such as a ceramic material.

In one embodiment the region (5) is sized according to an average detonation pressure. This pressure varies depending on the FTAC size and typical values are within the range of 1-4 Atm.

The outer FTAC (4) comprises relief means which is a frangible line (8) represented in FIG. 3A. FIG. 3B shows a sectional zoomed view of the frangible line (8).

This pressure relief concept is considered in the form of a fusible feature/device to evacuate the pressure caused by the detonation of fuel/air gases. The frangible line (8) is calibrated to rupture once a predetermined pressure level due to explosion gases is reached. The outer FTAC (4) itself is a fusible component, so once damaged, it must be replaced. Rip-stop features are also required to limit the crack propagation to the mounting holes of the outer FTAC (4) to avoid FTAC detachment from the lower wing skin and to ensure that the sealing requirements are still fulfilled.

In an embodiment the outer FTAC (4) comprises relief means which are a door (9) which pops-off once a predetermined pressure level due to explosion gases is reached. The pop-off door (9) comprises clipping means (10), as it can be seen in FIG. 4, for fixing the pop-off door (9) to the outer FTAC (4) wherein such clipping means (10) are adapted to be broken or deflected once a predetermined level of pressure due to explosion gases is reached. The clipping means (10) are designed to deflect/fracture at the minimum detonation pressure along with a conservative reserve factor.

In an embodiment the outer FTAC (4) comprises clipping means (10) designed for a detonation pressure of 1-4 Atm.

In an embodiment the pop off door (9) is made of metal.

In an embodiment the pop off door (9) is made of molded plastic. This embodiment has the advantage of being lighter and more economical to manufacture than the metal one.

In an embodiment of the invention, the outer FTAC (4) comprises relief means which are open vent means such that the void area (2) of the manhole is in communication with the atmosphere or the outside environment of the outer FTAC (4). In this concept, the outer FTAC (4) is open to atmosphere, so that air-fuel gases, either before the explosion or after it, are let outside. This is called the open vent concept.

In an embodiment of the invention, the open vent means comprise at least one orifice (12) on it.

In an embodiment of the invention, the solution of the pop-off door (9) is used in with a fire trap (11) to provide a barrier if the door is exposed to fire and it melts, in case of having a pop-off door made with a material that can melt. It is also used to prevent direct flame from touching the inner FTAC (3).

In an embodiment of the invention, a number of orifices (12) are located in such a way that they follow a direction according to the streamlines of the air flow (18) when the aircraft is flying under cruise conditions in order to minimize the aerodynamic drag. These orifices (12) provide an open door venting path between void area and the atmosphere. The size and shape of the orifices will depend on the volume and shape of the void area between the inner FTAC (3) and outer FTAC (4).

Figure 5:
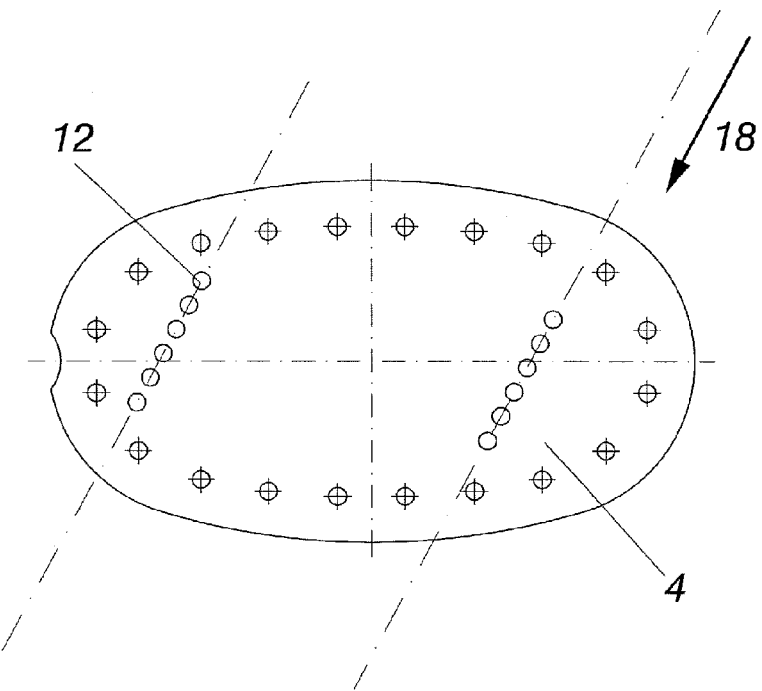
FIG. 5 This figure represents an embodiment of the open vent means in a view from below the wing.

In an embodiment, the outer FTAC (4) is elongated showing two ends wherein it comprises two pluralities of orifices (12), preferably six orifices (12). Each plurality of orifices (12) is a cluster distributed as a line according to the stream lines the air flow close to one end, providing a two hole pattern, one pattern at each end. This solution is represented in FIG. 5.

In an embodiment the size of the orifices (12) is in the range from 0.3 cm to 0.8 cm. These sizes depend on the gas velocity inside the void area.

In an embodiment of the invention, the outer FTAC (4) comprises an inner cover (15) located in the inner side of the outer FTAC (4) following a diagonal direction (18) according to the streamlines of the air flow when the aircraft is flying under cruise conditions. Between the inner cover (15) and the outer FTAC (4) a chamber (19) is enclosed such that:
  the orifices (12) are in communication with the chamber (19); and,
  the chamber (19) is also in communication with the void area (2) by means of an opening (13).

The inner cover (15) prevents any possible flame, in case of an external fire when the aircraft is on earth, from travelling towards the fuel tank (1).

Figure 6A:
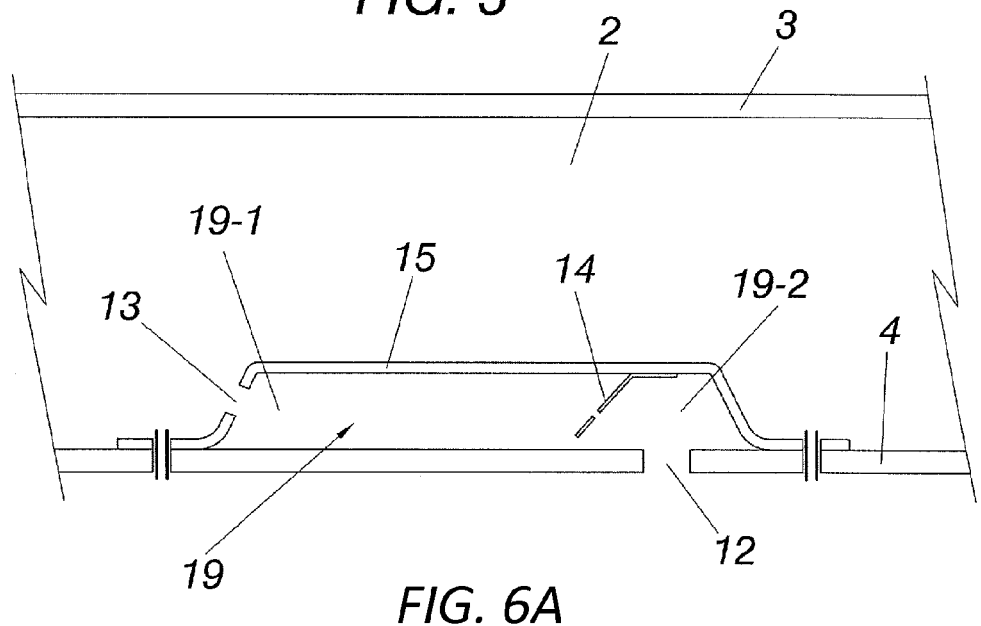
FIG. 6A This figure represents a sectional view of a solution for an open vent where a pressure baffle is provided on an inner cover.

In an embodiment the inner cover (15) or the outer FTAC (4) comprises a pressure baffle (14) to reduce shock waves due to the explosion, as it is represented in FIG. 6A, such that the chamber is divided at least in two sub-chambers:
  a first sub-chamber (19.1) in communication with the void area (2) through the opening (13); and,
  a second sub-chamber (19.2) in communication with the first sub-chamber (19.1) and also in communication with the open vent means.

In the embodiment represented in FIG. 6A, the pressure baffle (14) has a predetermined length and it is shaped in such a way that one end is parallel and in contact with the inner cover (15) and the other end forms a predetermined angle with the inner cover (15) towards the direction of the opening (13).

Figure 6B:
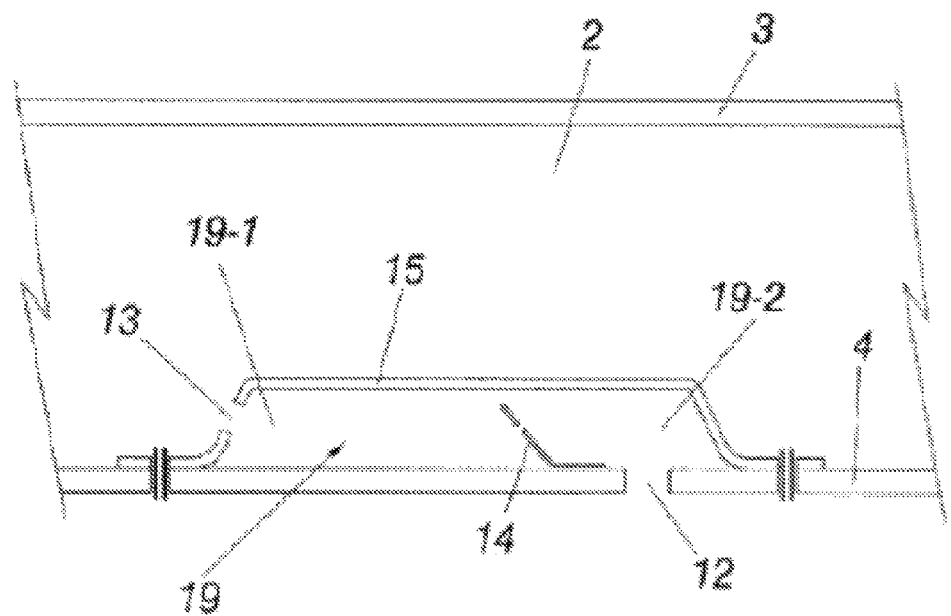
FIG. 6B This figure represents a sectional view of a solution for an open vent where a pressure baffle is provided on an outer FTAC.

FIG. 6B shows a similar embodiment as in FIG. 6A, but with the pressure baffle (14) being arranged in the outer FTAC (4).

Pressure baffles (14) are used to reduce the shockwave velocity to sub-sonic speeds so that the flow is not choked at the exit ports. Therefore, super-sonic conditions are avoided.

Figure 7:
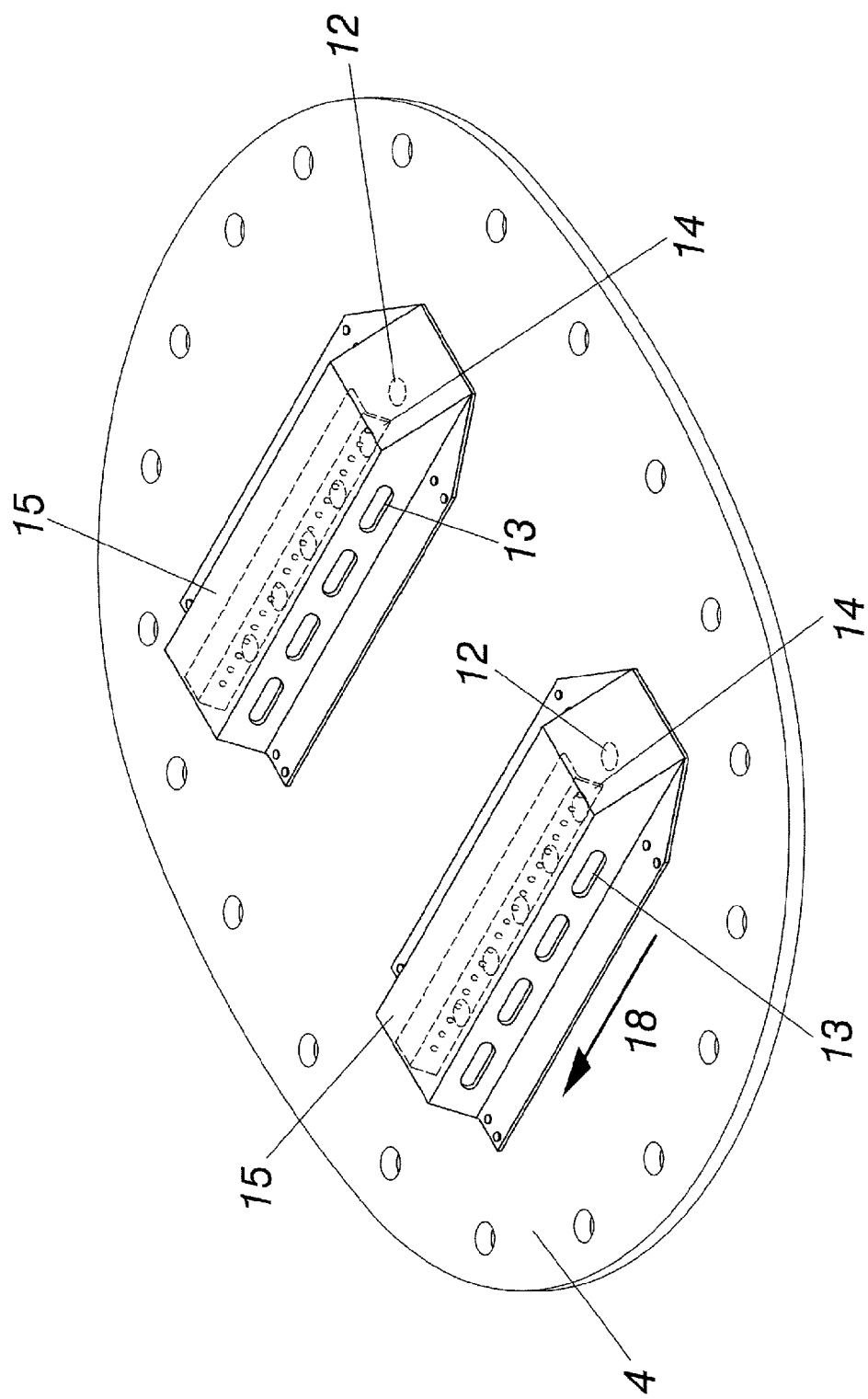
FIG. 7 This figure represents a perspective view of the inner part of an outer FTAC where an embodiment of the open vent concept is shown.

FIG. 7 represents a perspective view of the inner part of an outer FTAC (4) where an embodiment of the open vent concept is shown. The different elements for this embodiment can be differentiated:
- outer FTAC (4),
- orifices (12),
- inner cover (15) riveted to the internal surface of the outer FTAC (4),
- pressure baffle (14),
- inlet (13).

The elements located inside of the inner cover (15) are represented using a slashed line.

The invention claimed is:

1. An outer fuel tank access cover (outer FTAC) of an aircraft configured to cover an outer opening of a void area of a manhole for accessing an interior of a wing of an aircraft wherein the interior of the wing comprises a fuel tank, the outer FTAC comprising:
an explosion gases relief for letting explosion gases escape from the void area to an atmosphere and comprising an open vent such that the void area of the manhole is in communication with an outer part of the outer FTAC.

2. The outer FTAC according to claim 1 wherein the relief comprises a frangible line located on the cover and calibrated for being ruptured once a predetermined level of pressure due to explosion gases is reached.

3. The outer FTAC according to claim 1 wherein the relief comprises a frangible region, preferably a disk, adapted to be opened once a predetermined level of pressure is reached.

4. The outer FTAC according to claim 1 wherein the relief comprises a door comprising clipping for fixing the door to the FTAC wherein such door is adapted to pop-off and the clipping adapted to be broken or deflected once a predetermined level of pressure due to explosion gases is reached.

5. The outer FTAC according to claim 4 wherein the relief comprises a door and the void area comprises a fire trap.

6. The outer FTAC according to claim 1 wherein the explosion gases relief comprises a door made of plastic.

7. The outer FTAC according to claim 1 wherein the open vent comprises at least one orifice.

8. The outer FTAC according to claim 7 wherein the open vent comprises a number of orifices of the at least one orifice, which are located in such a way that the orifices follow a direction according to the streamlines of the air flow when the aircraft is flying under cruise conditions.

9. The outer FTAC according to claim 8 wherein the outer FTAC is elongated showing two ends wherein the outer FTAC comprises:
two pluralities of orifices, which are clusters distributed as a line according to the stream lines the air flow close to each end, providing a two hole pattern, one pattern in each end.

10. The outer FTAC according to claim 1 wherein the outer FTAC comprises:
an inner cover located in an inner side of the outer FTAC between which a chamber is enclosed such that:
the open vent is in communication with the chamber and,
the chamber is also in communication with the void area by an opening.

11. The outer FTAC according to claim 10 wherein the inner cover or the outer FTAC comprises:
a pressure baffle such that the chamber is divided at least in two sub-chambers:
a first sub-chamber in communication with the void area through the opening; and,
a second sub-chamber in communication with the first sub-chamber and also in communication with the open vent.

12. A wing of an aircraft comprising at least one fuel tank access comprising an outer FTAC according to claim 1.

13. An aircraft comprising a wing according to claim 12.

* * * * *